United States Patent [19]
MacPhail

[11] Patent Number: 6,046,739
[45] Date of Patent: Apr. 4, 2000

[54] SYSTEM AND METHOD FOR ORGANIZING OBJECTS MANAGED WITHIN A DESKTOP

[75] Inventor: Margaret Gardner MacPhail, Austin, Tex.

[73] Assignee: International Business Machines Corporation, Armonk, N.Y.

[21] Appl. No.: 08/829,556

[22] Filed: Mar. 28, 1997

[51] Int. Cl.⁷ ..................................................... G06F 3/00
[52] U.S. Cl. ........................ 345/333; 345/340; 345/356
[58] Field of Search ................................. 345/333, 334, 345/339, 347, 356, 340, 348, 349

[56] References Cited

U.S. PATENT DOCUMENTS

| | | | |
|---|---|---|---|
| 5,241,671 | 8/1993 | Reed et al. ............................ | 345/347 |
| 5,412,776 | 5/1995 | Bloomfield et al. . | |
| 5,504,852 | 4/1996 | Thompson-Rohrlich ............... | 245/340 |
| 5,717,877 | 2/1998 | Okton et al. ........................... | 345/326 |
| 5,796,952 | 8/1998 | Davis et al. ....................... | 395/200.54 |

*Primary Examiner*—Raymond J. Bayerl
*Assistant Examiner*—Cao H. Nguyen
*Attorney, Agent, or Firm*—Leslie A. Vanleeuwen

[57] ABSTRACT

The present invention provides a system and method for organizing objects managed within a desktop. A user may choose to create organizer objects to track and organize any type of object, or even to track and organize particular objects. The method of the present invention allows a user to create an organizer object within any container object on the desktop. An organizer object is a permanent and persistent object which tracks and organizes objects within the container as the objects are selected by the user. When an object of the tracked type is selected by the user, the desktop event handling mechanism notifies the appropriate organizer object. At any time, the user may choose to see the objects as they are organized by an organizer object. Desired objects are found with a minimal amount of effort by the user, and the user may customize the viewing and management of the list of tracked objects, or may choose to use system defaults for the viewing and management of the list of tracked objects.

33 Claims, 6 Drawing Sheets

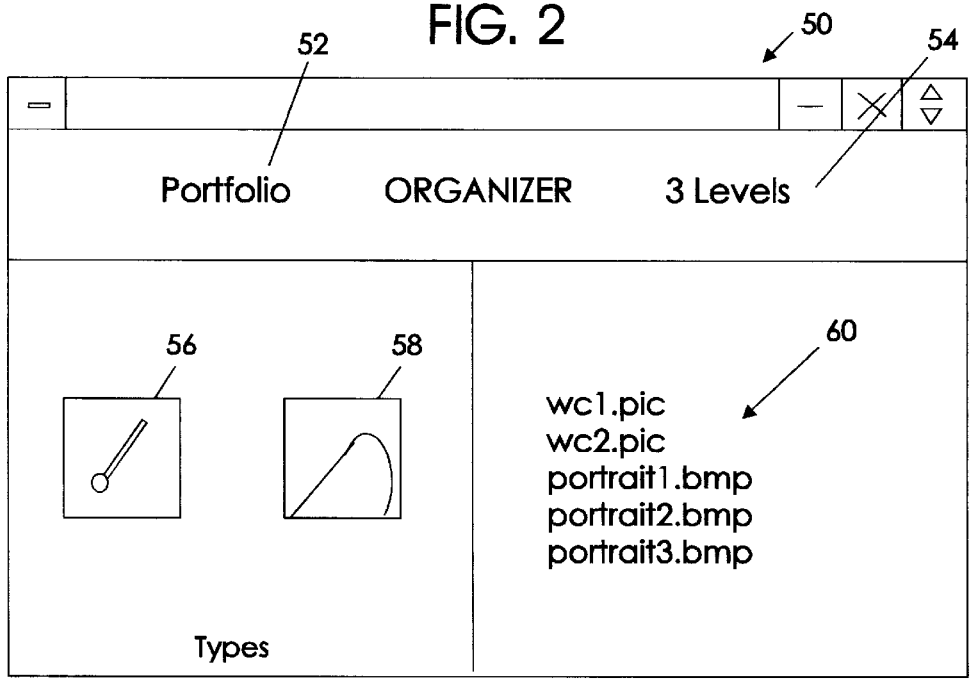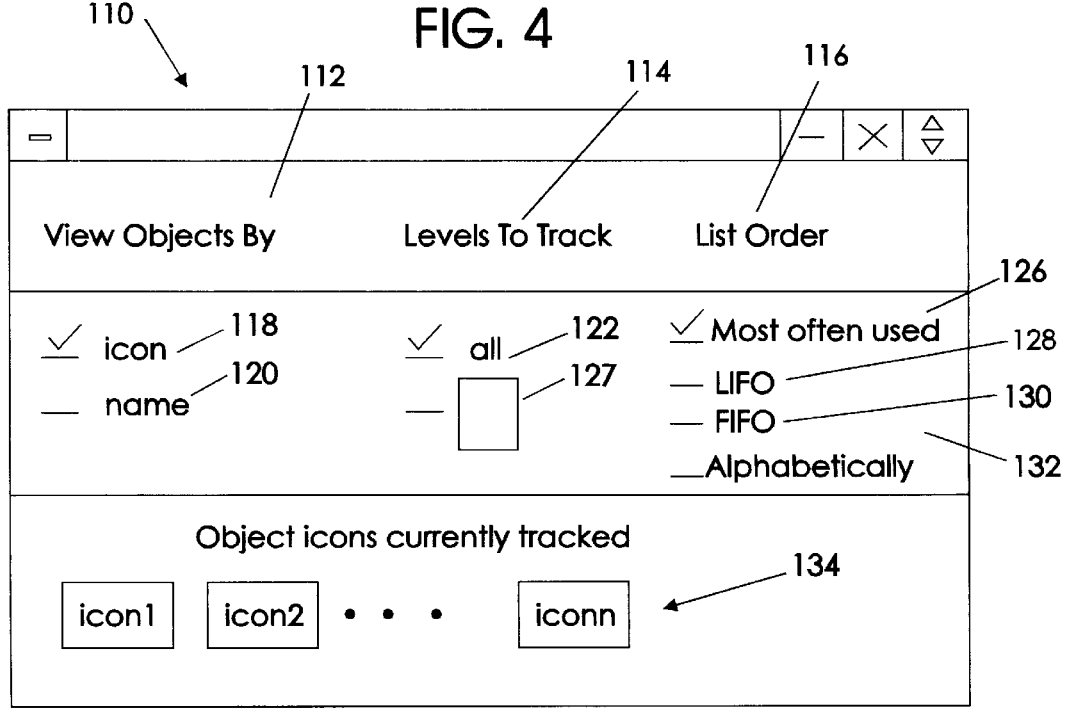

Customization of an Organizer Desktop Template

Creation of an Organizer Desktop Component

SYSTEM AND METHOD FOR ORGANIZING OBJECTS MANAGED WITHIN A DESKTOP

FIELD OF THE INVENTION

The invention relates to the field of information handling systems. More particularly, the invention relates to a system and method for tracking, organizing, and viewing objects managed by the information handling system.

BACKGROUND OF THE INVENTION

In an information handling system, the organization of files, programs, data, and any other desktop objects is frequently a problem for the user. Note that a desktop is a graphical user interface to system services. A desktop may be thought of as a container object (usually holding icons and menus) which allows users to run application programs and use a file system without directly using the command language of the operating system. Current desktops typically use container objects, such as folders, or other office-like container hierarchies, such as file cabinets, drawers, and folders. These organizations are typically file directory organizations that hold files, such as executables, data, or documentation. Linking mechanisms may allow a data file to be in more than one container simultaneously.

There are several prior art methods currently available to help users organize their desktops. Some application programs provide pull-down or pop-up menus, including submenus, to help users locate executable modules, data, or documentation. In addition, certain commands may be available, such as a "search" command or a "find" command, which will search a specified container or containers for a specific file or object.

However, there are several disadvantages to these prior art approaches. The user typically has to either guess or remember which container contains an object in order to start searching for the object. Determining a particular container and a level within the container hierarchy is referred to as determining the "scope" of the search. The user may have to execute a search command or a find command at several levels within a container to find the desired object. The user may also have to remember the exact name of an object in order to search for it. Further, many prior art search or find commands were originally designed to be used with files and directories, rather than with objects. Extending these commands for use with objects is often difficult. In most current systems, files are not true objects, in that they do not possess encapsulated states and behaviors. Instead, files are very specific operating system structures that can be accessed through directories, which are also specific operating system structures. Prior art search and find commands usually walk a file directory tree structure, which is very different from finding objects within a container object. Therefore, extending these prior art commands for use with objects often means putting objects in the same or new hierarchical containers or menus.

In addition to the problems described above, objects themselves are becoming more complex. Compound document architectures allow a user to create custom groupings of live objects. Note that a live object is an object that is a running application. For example, a compound document can contain a spreadsheet (data and executable), a text section (data and editor), and a video (data and player). All of these objects could be executing simultaneously. This is a new and useful organization tool for the desktop, but it also results in a need to organize these new, compound document objects.

Another type of desktop object is a global palette. A global palette is a container of generic objects which can be used to modify other objects. For example, a color object could be part of a global palette. This color object could be selected, dragged and dropped on to text, a bitmap, or a button. The color object can be accepted by the target object which then exhibits appropriate behavior, e.g. changes its color to that of the color object. Another global tool could be a magnifier which could cause a target object to change its size. While global palettes are useful tools, they increase the complexity of the desktop, making it even more critical that users be able to organize their desktops and keep track of particular objects.

Increasingly sophisticated desktops, with new types of objects, compound documents, and their applications, are making it harder, and more critical, for users to organize their desktops. Consequently, it would be desirable to have a system and method which allow users to organize their desktops. It would be desirable to allow users to organize and track any type of object, at any level (or levels) within a container hierarchy. Further, it would be desirable to allow users to customize the manner in which objects are organized and tracked, so that each user may organize and track objects in the manner which makes most sense to the individual user.

SUMMARY OF THE INVENTION

The present invention provides a system and method for organizing objects managed within a desktop. A user may choose to create organizer objects to track and organize any type of object, or even to track and organize particular objects. The method of the present invention allows a user to create an organizer object within any container object on the desktop. An organizer object is a permanent and persistent object which tracks and organizes objects within the container as the objects are selected by the user. When an object of the tracked type is selected by the user, the desktop event handling mechanism notifies the appropriate organizer object. At any time, the user may choose to see the objects as they are organized by an organizer object.

The method of the present invention may be implemented in an information handling system which includes one or more processors, memory, and input/output means. One of the embodiments of the invention is as sets of instructions resident in an information handling system.

It is an advantage of the present invention that desired objects are found with a minimal amount of effort by the user. It is another advantage of the present invention that the user may choose which object types to track, and may specify the depth of the container level to track. It is a further advantage of the present invention that the user may customize the viewing and management of the list of tracked objects, or may choose to use system defaults for the viewing and management of the list of tracked objects.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which:

FIG. 2 depicts an organizer object, as it may be viewed by a user;

FIG. 4 illustrates a customize dialog which may be used to customize an organizer template object;

DETAILED DESCRIPTION OF A PREFERRED EMBODIMENT OF THE INVENTION

Figure 1:
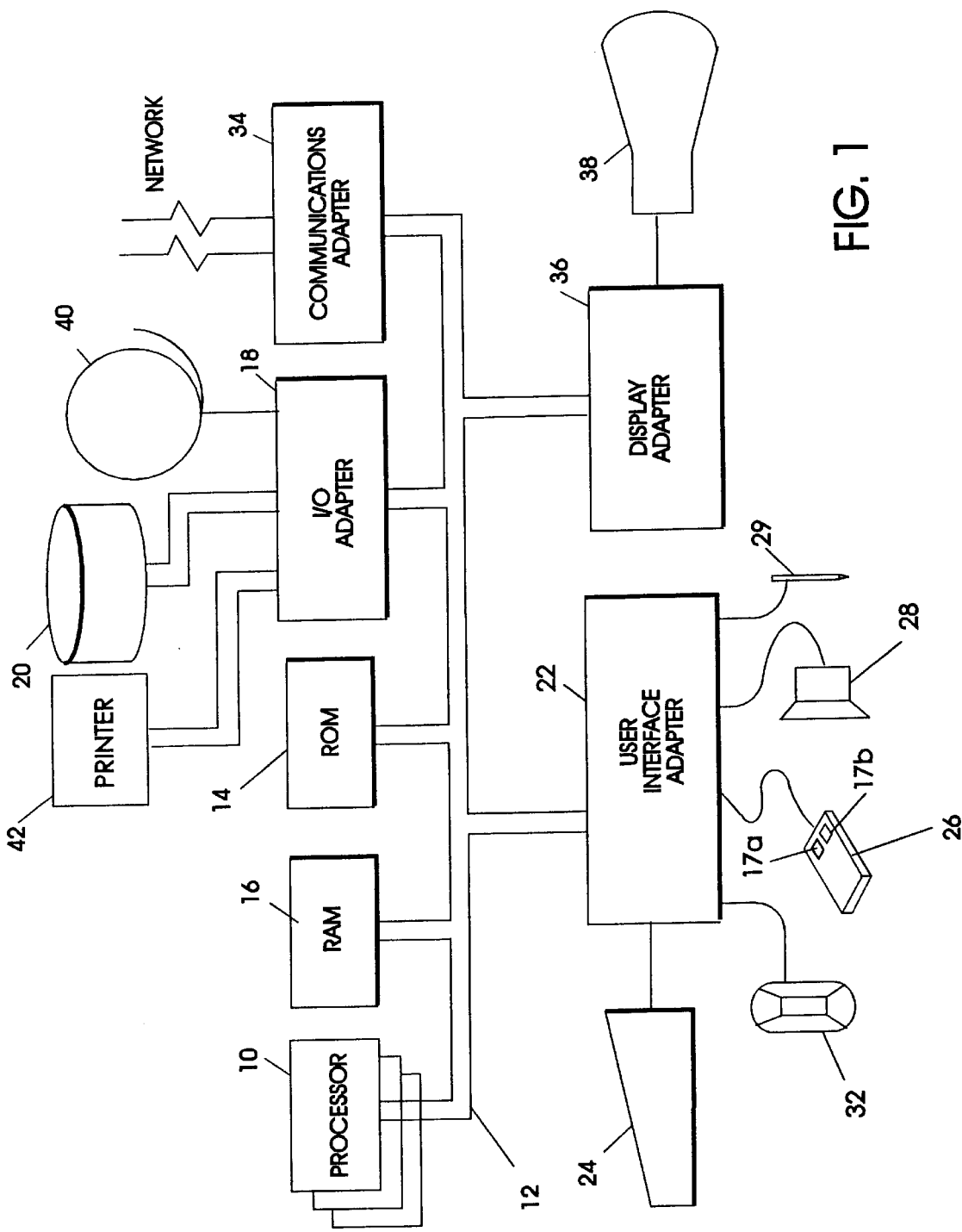
FIG. 1 is a block diagram of an information handling system capable of executing the organizing and tracking method of the present invention.

The invention may be implemented on a variety of hardware platforms, including personal computers, workstations, mini-computers, and mainframe computers. Many of the steps of the method of the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38. Communication adaptor 34 may link the system depicted in FIG. 1 with hundreds or even thousands of similar systems, or other devices, such as remote printers, remote servers, or remote storage units.

The present invention deals primarily with container objects and desktop components. A container object is an object which holds other objects, providing a user with a way to hold or group related objects. A container object may also contain other containers, thus resulting in a hierarchy of container objects. A desktop component is an object which conforms to the rules of the desktop. Desktop components handle appropriate events for their type, and exhibit appropriate behavior for their type based on these events. Desktop components typically handle the user interface function of the desktop, and call the underlying objects which actually perform the functions requested by a user. A desktop component may or may not be a container object. However, a container object is always a desktop component.

The system and method of the present invention provide an embeddable, user-customizable organizing component, which keeps track of frequently used, persistent objects within an information handling system. Note that a persistent object is an object that continues to exist and retains its value even when the program which created the object is not executing. An organizer object can be embedded within any type of container, and at any level within the container hierarchy. In addition, an organizer object may contain other organizer objects.

A user chooses which object-types to track. For example, a user may choose to track all spreadsheet objects within a particular container object. Alternately, the user may choose to track all word processing objects and all spreadsheet objects within the container. Any combination of object types may be tracked. The user selects the object-types to track by selecting an object-type template, or an object or file, and dragging and dropping it onto the organizer object, or onto an organizer template object (as described below, with reference to FIGS. 3 and 5).

The organizer object keeps track of which files or objects, within the types chosen, are selected by the user. The container holding the organizer notifies the organizer object when a contained object of the tracked type is selected. At any time, the user may view the frequently selected object lists by opening, or viewing an already open, organizer object. The user may leave an organizer object open on the desktop, and thus be able to see the organizer object keep itself up to date. The user does not have to remember the name of an object, or the container in which an object is located, in order to find and use a particular object. Rather, a user simply views the objects as tracked by the organizer object.

The user may also customize the viewing and management of the objects in the organizers. For example, the user may organize the lists of objects by type, so that all objects of one type are in a pull-down list. Further organizing of the pull-down list is possible. For example, the list may be kept in alphabetical order, LIFO (last in, first out), FIFO (first in, first out) or most often used order. The user may even specify the depth of the container level to track. Many container objects store other container objects. Often, there are many levels of nested container objects stored within a single container object. The system and method of the present invention allow the user to specify how many levels to track. In other words, the user may choose to track only objects contained within the first level of the container, all levels of the container, or some number of levels in between.

Although many customizing options are available to users, users are not required to customize organizer objects. The system and method of the present invention provides defaults so that the user is not required to customize the viewing or management of the object lists.

Referring now to FIG. 2, an organizer component or object 50 is shown. FIG. 2 is shown for illustration purposes only. Organizer object 50 may be presented to the user in a variety of ways, including a minimized icon view, or a dynamically running organizer view. As shown in FIG. 2, organizer object 50 shows the name of the container being tracked 52, and the levels within the container being tracked 54. In this case, three levels within the Portfolio container are being tracked by organizer object 50. Organizer object 50 also shows the icons of the filetypes being tracked, in this case watercolors 56 and portraits 58. Finally, organizer object 50 contains a list of objects 60 that are currently being tracked by organizer object 50. In the example shown, list 60 is a text list. However, the objects could also be shown as a list of icons (with labels to differentiate between actual objects), or simply as generic icons (i.e. icons with no labels which would represent a particular type of object). The user could select a generic icon for expansion, in which case a list of icons, or a text list, would then be shown.

Figure 3A:
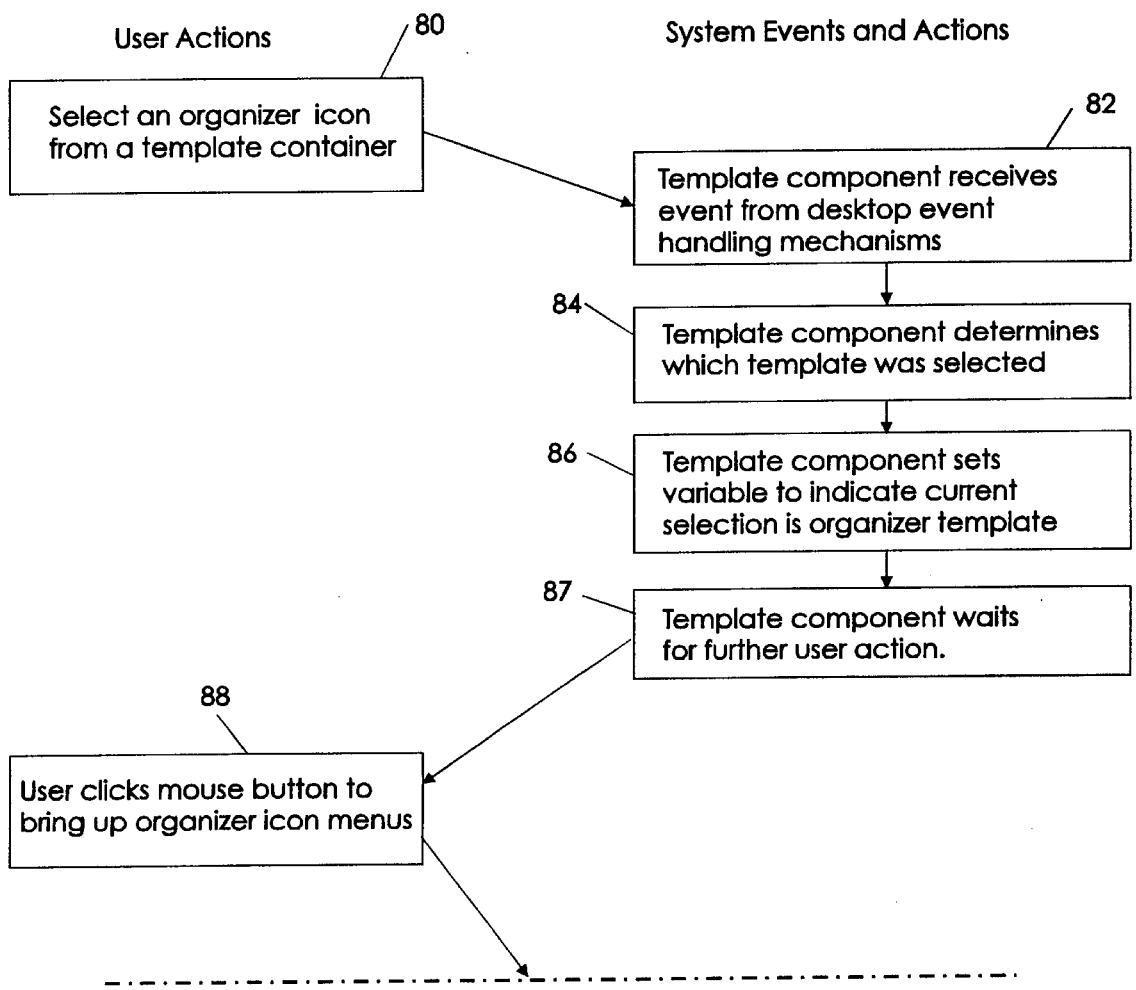
FIG. 3 is a flow chart depicting a method of customizing an organizer template object according to the present invention.
Figure 3B:
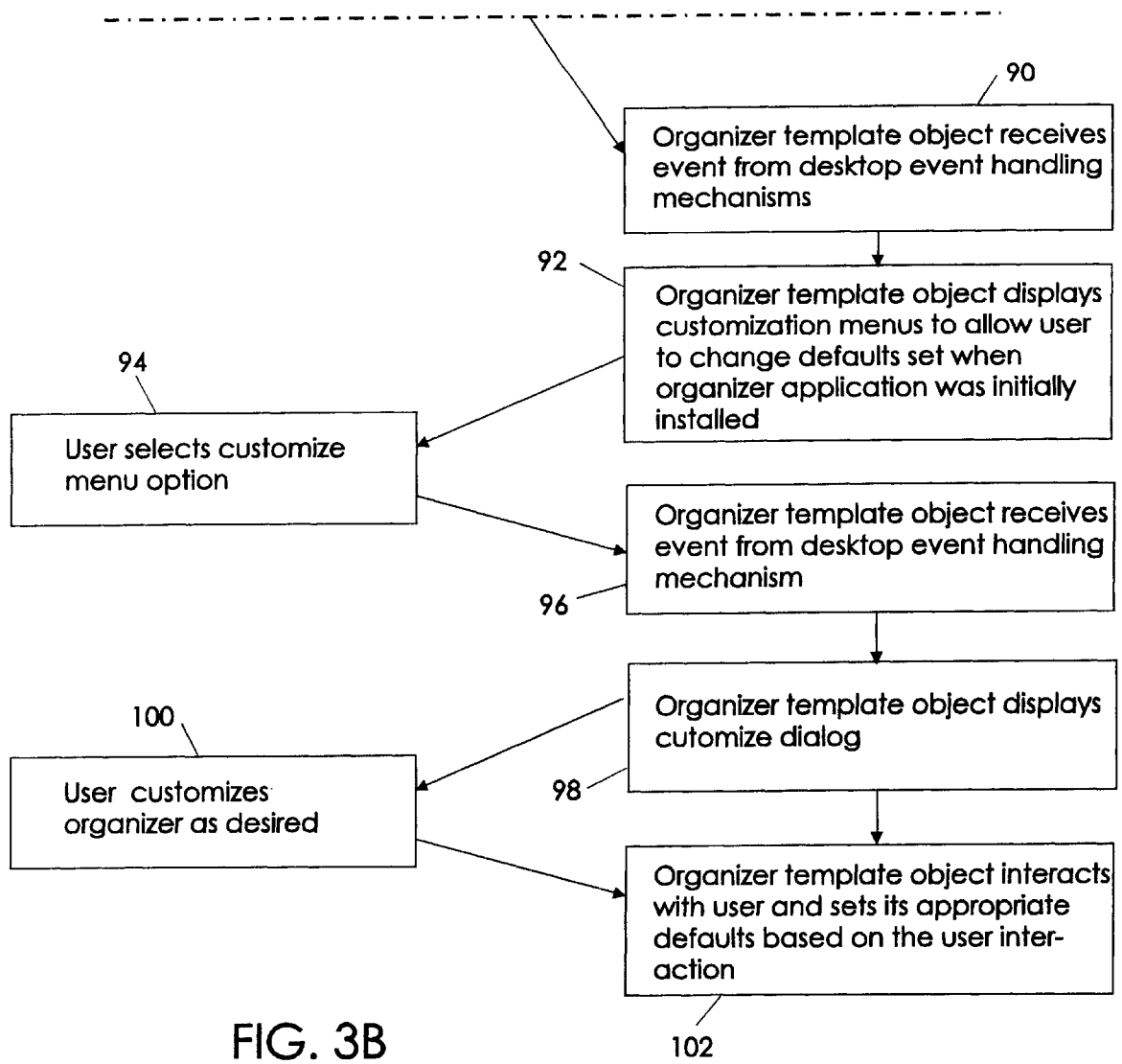

Referring now to FIG. 3, a method of customizing an organizer template object will be described. An organizer template object defines the defaults used whenever a new organizer object is created. The user may choose to use the system defaults (defined when the organizer application is first loaded onto the system), or may use the method depicted in FIG. 3 to customize the organizer template object.

To customize an organizer template object, the user selects an organizer icon from a template container (step 80). This can be done by a mouse click on an organizer icon that is displayed within a template folder. Alternately, this can be done by a mouse click on an organizer label or icon within a create-object submenu on the desktop. The template component receives the appropriate events from the desktop event handling mechanisms (step 82). These events include information such as the desktop coordinate of the selection event. The template component then determines which template was selected by comparing the selection coordinate with the location of the various templates (step 84). The template component then sets a variable to indicate that the current selection is the organizer template object (step 86), and then waits for further user action (step 87).

The user keeps the mouse over the organizer icon (or moves it over the organizer icon) and clicks the mouse button associated with menus (step 88). The template component receives the appropriate events from the desktop event handling mechanisms (step 90), and displays customization menus and dialogs (step 92). The user then selects a customize menu option (step 94). The template component again receives the appropriate events from the desktop event handling mechanism (step 96), and displays a customize dialog (step 98). The user then customizes the organizer template object as desired (step 100). The organizer template object interacts with the user and sets its appropriate defaults based on the user interaction (step 102).

Note that although a user can customize the organizer template object so that it creates an organizer object with "customized" default settings, the user can also change the settings of an individual organizer object after it has been created. The method of customizing an individual organizer object would be similar to steps 88 through 102 in FIG. 3.

FIG. 4 depicts a customize dialog 110 which may be used to allow a user to customize an organizer template. "View Objects By" 112, "Levels To Track" 114, and "List Order" 116 are check boxes, meaning that the user can select just one of the options shown. For example, the user may choose to view objects by either icon 118 or name 120. The user may choose to track all levels 122 or may type in a number of levels to track in box 124. The user may choose to list the objects in most often used order 126, LIFO order 128, FIFO order 130, or alphabetically 132.

"Object icons currently tracked" is a display of icons 134 which represent the object types currently being tracked. To delete an object type, the user can select an icon and drag it to the trash bin (i.e. another icon, representing a delete function), or could use a pull-down menu option to delete selected icons. To add an icon, the user could drag and drop an icon onto dialog 110. In the example shown, if the user had selected "view objects by name" 120, the object types currently tracked would be shown by name, rather than by icon.

Figures 5, 5A:
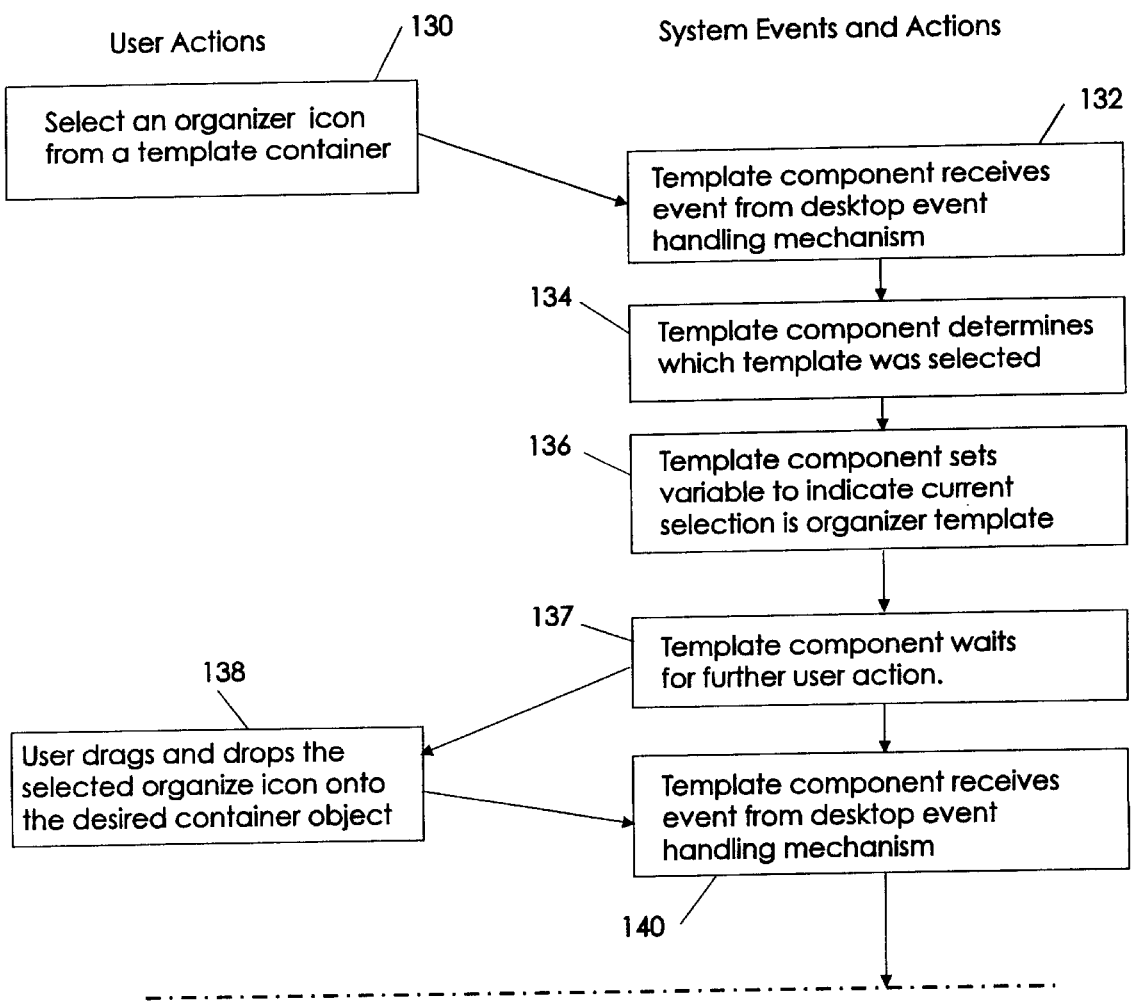
FIG. 5 is a flow chart depicting a method of creating an organizer object according to the present invention.
Figure 5B:
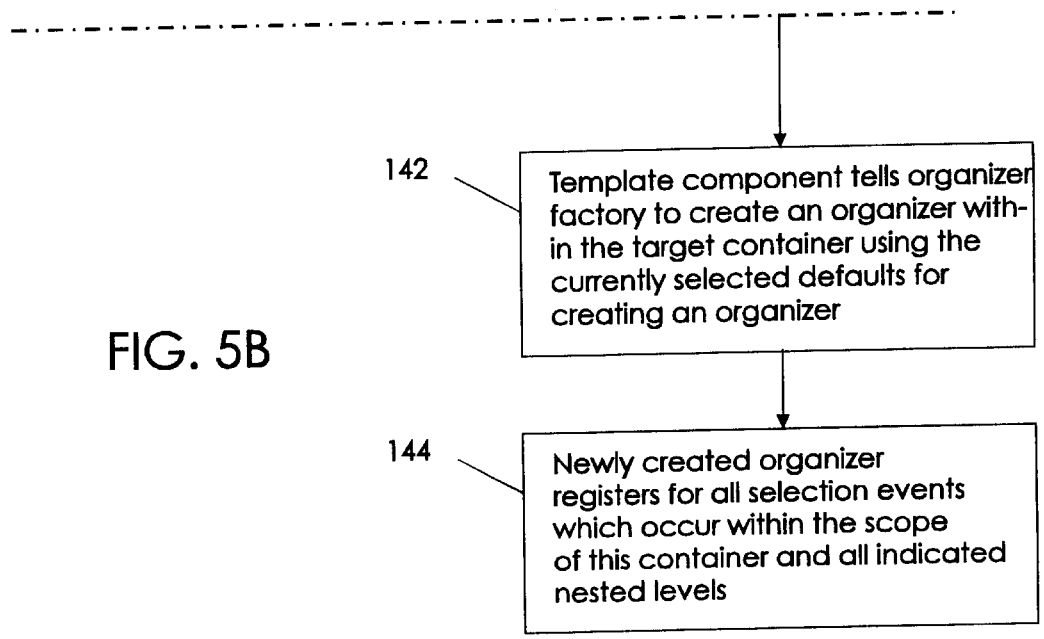

Referring now to FIG. 5, a flow chart depicting a method of creating an organizer component, or object, will be described. The user first selects an organizer icon from a template container (step 130). As described above with reference to FIG. 3, this can be done by clicking on an organizer icon within a template folder, or by clicking on an organizer label or icon within a create-object submenu on the desktop. The template component receives the appropriate events from the desktop event handling mechanism, including the desktop coordinate of the selection event (step 132), and determines which template was selected (step 134).

The template component then sets a variable to indicate that the current selection is the organizer template (step 136), and then waits for further user action (step 137). At this point the user drags the selected organizer icon onto a desired container object (step 138). This step could also be done within a menu context by popping up a dialog box with an entry field into which the user could type the name of the desired container object. The template component receives the appropriate events from the desktop event handling mechanism (step 140) and then the organizer template object creates an organizer object within the target container, using the currently selected defaults (as set by the system when the organizer application was originally loaded, or as defined by the user using the method depicted in FIG. 3) (step 142). The newly created organizer object registers for all selection events which occur within the scope of the target container, and all indicated nested levels within the target container (step 144).

Figure 6:
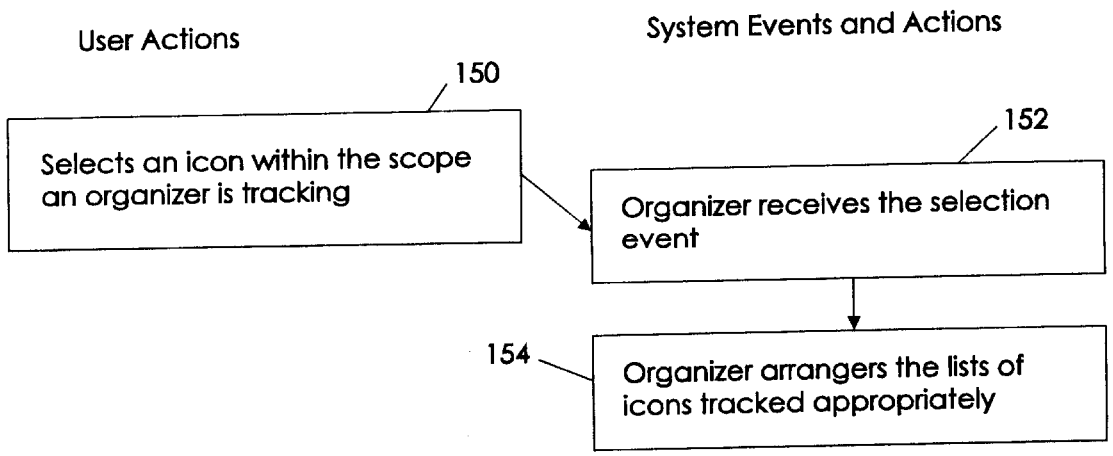
FIG. 6 is a flow chart depicting a method of updating an organizer object according to the present invention.

Once the organizer object has been created, it is updated whenever the user selects an object which is within the container being tracked and is of the object type being tracked. Referring now to FIG. 6, a method of updating an organizer object will be described. When a user selects an icon within the scope (i.e. object type and level within a targeted container) (step 150), the appropriate organizer object receives the selection event (step 152). The organizer object then either adds to or rearranges the list of icons tracked (step 154). For example, if the organizer object was tracking objects on a LIFO basis, the selected icon would be placed at the top of the current icon list.

The following pseudocode further details the manner in which step 154 may be implemented:

```
IF this is the first time this object has been selected
    THEN create a new entry for this object
END IF
Add 1 to the use-counter for this object
Set the last object used to this object
SWITCH on list order method:
CASE most often used
    rearrange the list by most often used
    BREAK
CASE LIFO:
    add this object to the top of the list
    IF this object is on the list in another position
        THEN remove the object from the other position
    END IF
    BREAK
CASE FIFO:
    IF this object is NOT on the list in another position
        THEN add the object to the bottom of the list
    END IF
    BREAK
CASE alphabetical:
    IF this object is NOT on the list in another position
        THEN add the object to the list in alphabetical order
    END IF
    BREAK
END SWITCH
```

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method of organizing objects in an information handling system, comprising:

creating a first object of a first object type, wherein the first object is a permanent and persistent object, and wherein the first object is associated with a selected container;

selecting one or more object types to be tracked by the first object, wherein a plurality of object types exist in the information handling system, and wherein each object in the information handling system is of one of the plurality of object types, and wherein objects of a same object type share one or more characteristics;

in response to a user selection of a second object of a second object type, wherein the second object is within the selected container, determining if the second object type is of one of the object types to be tracked by the first object; and if the second object type is of one of the object types to be tracked by the first object, updating the first object to indicate that the second object was selected by the users, wherein said updating includes adding the second object to a list maintained by the first object, wherein the list contains frequently selected objects from the container associated with the first object.

2. A method according to claim 1, wherein said selecting one or more object types to be tracked by the first object comprises selecting one or more file types to be tracked by the first object.

3. A method according to claim 1, wherein said updating further comprises arranging the list in a predetermined order.

4. A method according to claim 1, wherein the first object is an organizer object.

5. A method according to claim 1, wherein said creating further comprises customizing a template, wherein the template is used to determine one or more default settings for the first object.

6. A method according to claim 5, wherein said customizing comprises:

providing a user with a plurality of template objects from which to select a particular template object;

in response to a user selected template object, determining which template object was selected;

displaying a customization menu, wherein said displaying provides the user with one or more customization choices from which to select; and in response to a user selected customization choice, determining a default setting.

7. A method according to claim 6, wherein said selecting comprises dragging and dropping a selected object onto the user selected template object, wherein the selected object is of one of the object types to be tracked by the first object.

8. A method according to claim 1, wherein said updating further comprises notifying the first object that the second object was selected by the user.

9. A method according to claim 8, wherein said selecting further comprises registering the first object for selection events within a scope of the container.

10. A method according to claim 9, wherein said registering further comprises registering the first object for selection events within one or more nested levels of the container.

11. A method according to claim 9, wherein said notifying comprises posting an event for the first object.

12. An information handling system, comprising:

one or more processors;

storage means;

input/output means;

display means;

one or more images of an operating system for controlling operation of said processors;

means for creating a first object of a first object type, wherein the first object is a permanent and persistent object, and wherein the first object is associated with a selected container;

means for selecting one or more object types to be tracked by the first object, wherein a plurality of object types exist in the information handling system, and wherein each object in the information handling system is of one of the plurality of object types, and wherein objects of a same object type share one or more characteristics;

means for determining if a user-selected object from within the selected container is of one of the object types to be tracked by the first object; and means for updating the first object to indicate that the second object was selected by the user, wherein said means for updating comprises means for adding the second object to a list maintained by the first object, wherein the list contains frequently selected objects from the container associated with the first object.

13. An information handling system according to claim 12, wherein said means for selecting one or more object types to be tracked by the first object comprises means for selecting one or more file types to be tracked by the first object.

14. An information handling system according to claim 12, wherein said means for updating further comprises means for arranging the list in a predetermined order.

15. An information handling system according to claim 12, wherein the first object is an organizer object.

16. An information handling system according to claim 12, wherein said means for creating further comprises means for customizing a template, wherein the template is used to determine one or more default settings for the first object.

17. An information handling system according to claim 16, wherein said means for customizing comprises:

means for providing a user with a plurality of template objects from which to select a particular template object;

means for determining which template object was selected;

means for displaying a customization menu, wherein said displaying provides the user with one or more customization choices from which to select; and means for determining a default setting based on a user selected customization choice.

18. An information handling system according to claim 17, wherein said means for selecting comprises means for dragging and dropping a selected object onto the user selected template object, wherein the selected object is of one of the object types to be tracked by the first object.

19. An information handling system according to claim 12, wherein said means for updating further comprises means for notifying the first object that the second object was selected by the user.

20. An information handling system according to claim 19, wherein said selecting further comprises means for registering the first object for selection events within a scope of the container.

21. An information handling system according to claim 20, wherein said means for registering further comprises means for registering the first object for selection events within one or more nested levels of the container.

22. An information handling system according to claim 20, wherein said means for notifying comprises means for posting an event for the first object.

23. A computer-usable medium, comprising:

means for creating a first object of a first object type, wherein the first object is a permanent and persistent object, and wherein the first object is associated with a selected container;

means for selecting one or more object types to be tracked by the first object, wherein a plurality of object types exist, and wherein each object is of one of the plurality of object types, and wherein objects of a same object type share one or more characteristics;

means for determining if a user-selected object from within the selected container is of one of the object types to be tracked by the first object; and means for updating the first object to indicate that the second object was selected by the user, wherein said means for updating comprises means for adding the second object to a list maintained by the first object, wherein the list contains frequently selected objects from the container associated with the first object.

24. A computer-usable medium according to claim 23, wherein said means for selecting one or more object types to be tracked by the first container comprises means for selecting one or more file types to be tracked by the first container.

25. A computer-usable medium according to claim 23, wherein said means for updating further comprises means for arranging a list in a predetermined order;

means for posting an event for the first object.

26. A computer-usable medium according to claim 23, wherein the first object is an organizer object.

27. A computer-usable medium according to claim 23, wherein said means for creating further comprises means for customizing a template, wherein the template is used to determine one or more default settings for the first object.

28. A computer-usable medium according to claim 27, wherein said means for customizing comprises:

means for providing a user with a plurality of template objects from which to select a particular template object;

means for determining which template object was selected;

means for displaying a customization menu, wherein said displaying provides the user with one or more customization choices from which to select; and means for determining a default setting based on a user selected customization choice.

29. A computer-usable medium according to claim 28, wherein said means for selecting comprises means for dragging and dropping a selected object onto the user selected template object, wherein the selected object is of one of the object types to be tracked by the first object.

30. A computer-usable medium according to claim 23, wherein said means for updating further comprises means for notifying the first object that the second object was selected by the user.

31. A computer-usable medium according to claim 30, wherein said selecting further comprises means for registering the first object for selection events within a scope of the container.

32. A computer-usable medium according to claim 31, wherein said means for registering further comprises means for registering the first object for selection events within one or more nested levels of the container.

33. A computer-usable medium according to claim 31, wherein said means for notifying comprises means for posting an event for the first object.

* * * * *